US010533927B2

(12) United States Patent
Molin et al.

(10) Patent No.: US 10,533,927 B2
(45) Date of Patent: Jan. 14, 2020

(54) METHOD FOR QUALIFYING THE EFFECTIVE MODAL BANDWIDTH OF A MULTIMODE FIBER OVER A WIDE WAVELENGTH RANGE FROM A SINGLE WAVELENGTH DMD MEASUREMENT AND METHOD FOR SELECTING A HIGH EFFECTIVE MODAL BANDWIDTH MULTIMODE FIBER FROM A BATCH OF MULTIMODE FIBERS (71) Applicant: Draka Comteq B.V., Amsterdam (NL)

(72) Inventors: Denis Molin, Paron (FR); Pierre Sillard, Paron (FR); Marianne Bigot, Paron (FR)

(73) Assignee: Draka Comteq B.V., Amsterdam (NL)

( * ) Notice: Subject to any disclaimer, the term of this patent is extended or adjusted under 35 U.S.C. 154(b) by 177 days.

(21) Appl. No.: 15/448,040

(22) Filed: Mar. 2, 2017

(65) Prior Publication Data

US 2017/0176285 A1    Jun. 22, 2017

Related U.S. Application Data

(63) Continuation of application No. PCT/IB2014/002100, filed on Sep. 3, 2014.

(51) Int. Cl.
    G01M 11/00    (2006.01)
(52) U.S. Cl.
    CPC .................. *G01M 11/338* (2013.01)
(58) Field of Classification Search
    CPC ................. G01M 11/338; G01M 11/00
    See application file for complete search history.

(56) References Cited

U.S. PATENT DOCUMENTS 8,351,027 B2 * 1/2013 Pimpinella ............ G01M 11/338
                                                       356/73.1
8,922,763 B2 * 12/2014 Tudury ................ G01M 11/335
                                                       356/73.1

(Continued)

FOREIGN PATENT DOCUMENTS

| EP | 2144096 | * | 1/2010 |
| EP | 2144096 A1 | | 1/2010 |
| WO | 2016/034913 A1 | | 3/2016 |

OTHER PUBLICATIONS

International Search Report in counterpart International Application No. PCT/IB2014/002100 dated Jun. 9, 2015, pp. 1-2.

(Continued)

*Primary Examiner* — Mohamed Charioui
*Assistant Examiner* — Catherine T. Rastovski
(74) *Attorney, Agent, or Firm* — Additon, Higgins & Pendleton, P.A.

(57) ABSTRACT

The invention relates to a method for qualifying the actual effective modal bandwidth of a multimode optical fiber over a predetermined wavelength range, comprising the steps of: carrying out (30) a Dispersion Modal Delay (DMD) measurement of the multimode optical fiber at a single wavelength to obtain an actual DMD plot; generating (32) at least two distinct modified DMD plots from the actual DMD plot, each modified DMD plot being generated by applying to the recorded traces a temporal delay $\Delta t$ that increases in absolute values with the radial offset value $r_{offset}$, each modified DMD plot being associated with a predetermined bandwidth threshold (S1; S2); for each modified DMD plot, computing (33) an effective modal bandwidth as a function of said modified DMD plot and comparing (34) the computed effective modal bandwidth ($EMBc_1$; $EMBc_2$) with the bandwidth threshold value to which the modified DMD plot is (Continued)

associated; (35) qualifying the actual effective modal bandwidth as a function of results from the comparing step.

16 Claims, 9 Drawing Sheets

(56) References Cited

U.S. PATENT DOCUMENTS

| | | | | |
|---|---|---|---|---|
| 2010/0142969 A1* | 6/2010 | Gholami | ............ | H04B 10/2507 |
| | | | | 398/143 |
| 2010/0171945 A1* | 7/2010 | Gholami | .............. | G01M 11/338 |
| | | | | 356/73.1 |
| 2011/0054861 A1 | 3/2011 | Lane et al. | | |
| 2011/0293290 A1 | 12/2011 | Gholami et al. | | |
| 2012/0092651 A1* | 4/2012 | Molin | .................. | G01M 11/088 |
| | | | | 356/73.1 |
| 2012/0099099 A1 | 4/2012 | Tudury et al. | | |
| 2014/0368809 A1* | 12/2014 | Chen | .................... | G01M 11/335 |
| | | | | 356/51 |

OTHER PUBLICATIONS

Written Opinion in counterpart International Application No. PCT/IB2014/002100 dated Jun. 5, 2015, pp. 1-6.
International Preliminary Report on Patentability in counterpart International Application No. PCT/IB2014/002100 dated Mar. 7, 2017, pp. 1-8.

* cited by examiner

METHOD FOR QUALIFYING THE EFFECTIVE MODAL BANDWIDTH OF A MULTIMODE FIBER OVER A WIDE WAVELENGTH RANGE FROM A SINGLE WAVELENGTH DMD MEASUREMENT AND METHOD FOR SELECTING A HIGH EFFECTIVE MODAL BANDWIDTH MULTIMODE FIBER FROM A BATCH OF MULTIMODE FIBERS

1. CROSS-REFERENCE TO PRIORITY APPLICATION

This application is a continuation of International Application No. PCT/IB2014/002100 for Method for qualifying the effective modal bandwidth of a multimode fiber over a wide wavelength range from a single wavelength DMD measurement and method for selecting a high effective modal bandwidth multimode fiber from a batch of multimode fibers (filed Sep. 3, 2014, and published Mar. 10, 2016, as Publication No. WO 2016/034913 A1), each of which is hereby incorporated by reference in its entirety.

2. FIELD OF THE INVENTION

The present invention relates to the field of optical fiber transmissions and, more specifically, to multimode fibers used in relative long reach and high bitrate systems.

More specifically, the invention relates to a method of qualifying the effective modal bandwidth of a multimode optical fiber over a wide wavelength range.

The invention is applied, in particular but not exclusively, to wide-band OM4 multimode fibers.

Wide-band multimode fiber is understood as a multimode fiber having a relatively wide operational wavelength range, in particular but not exclusively, a wavelength range comprised between 850 nm and 950 nm.

3. TECHNOLOGICAL BACKGROUND

Multimode fibers are successfully used in high-speed data networks together with high-speed sources that typically use transversally multimode vertical cavity surface emitting lasers, more simply called VCSELs. However, multimode fibers are affected by intermodal dispersion, which results from the fact that, for a particular wavelength, several optical modes propagate simultaneously along the fiber, carrying the same information but travelling with different propagation velocities. Modal dispersion is expressed in terms of Differential Mode Delay (DMD), which is a measure of the difference in pulse delay between the fastest and slowest modes traversing the multimode fiber.

In order to minimize modal dispersion, the multimode optical fibers used in data communications generally comprise a core showing a refractive index that decreases progressively going from the center of the fiber to its junction with a cladding. In general, the index profile is given by a relationship known as the "$\alpha$ profile," as follows:

$$n(r) = n_0 \sqrt{1 - 2\Delta \left(\frac{r}{a}\right)^\alpha} \text{ for } r \le a,$$

where:
$n_0$ is a refractive index on an optical axis of a fiber;
r is a distance from said optical axis;
a is a radius of the core of said fiber;
$\Delta$ is a non-dimensional parameter, indicative of an index difference between the core and a cladding of the fiber; and
$\alpha$ is a non-dimensional parameter, indicative of a shape of the index profile.

When a light signal propagates in such a core having a graded index, the different modes experience a different propagation medium, which affects their speed of propagation differently. By adjusting the value of the parameter $\alpha$, it is thus possible to theoretically obtain a group velocity, which is virtually equal for all the modes and thus a reduced intermodal dispersion for a particular wavelength. However, an optimum value of the parameter $\alpha$ is valid for a particular wavelength only. Furthermore, the exact parameter value $\alpha$, as well as the actual shape of the refractive index profile, are difficult to control during manufacture of the multimode fiber.

Enabled by VCSEL technology, high-speed multimode optical fibers, such as OM4 fibers (which are laser-optimized, high bandwidth 50 µm multimode fibers, standardized by the International Standardization Organization in document ISO/IEC 11801, as well as in TIA/EIA 492AAAD standard), have proved to be the medium of choice for high data rate communications, delivering reliable and cost-effective 10 to 100 Gbps solutions. The combination of Wide-Band (WB) multimode fibers with longer-wavelengths VCSELs for Coarse Wavelength Division Multiplexing (CWDM) is an interesting option to be considered in order to meet the future increase of demand.

However, the modal bandwidth of OM4 fibers until now has only been achieved over a narrow wavelength range (typically 850 nm+/−10 nm). The feasibility of Wide-Band (WB) multimode fibers satisfying OM4 performance requirements over a broader wavelength range is a challenge to overcome for next generation multimode systems.

The OM4 fiber performance is usually defined by an Effective Modal Bandwidth (EMB) assessment at a given wavelength $\lambda_0$. For instance, OM4 fibers should exhibit EMB greater than 4,700 MHz-km at a wavelength of 850 nm+/−1 nm. The achievement of such high EMB values requires an extremely accurate control of refractive index profiles of multimode fibers. Up to now, traditional manufacturing processes cannot guarantee such high EMB, and generally it is hard to accurately predict the EMB values from refractive index profile measurements on core rod or cane, especially when high EMB (typically larger than 2,000 MHz-km) is expected, meaning the fiber refractive index profile is close to the optimal profile. As a matter of fact, EMB is directly assessed on fibers.

The Effective Modal Bandwidth (EMB) is assessed by a measurement of the delay due to the modal dispersion, known under the acronym DMD for "Dispersion Modal Delay." It consists of recording pulse responses of the multimode fiber for single-mode launches that radially scan the core. It provides a DMD plot that is then post-processed in order to assess the minimal EMB a fiber can deliver. The DMD measurement procedure has been the subject of standardization (IEC 60793-1-49 and FOTP-220) and is also specified in Telecommunications Industry Association Document no. TIA-455-220-A. The DMD metric, also called DMD value, is expressed in units of picoseconds per meter (ps/m). It assesses the delay between the fastest and the slowest pulses considering a collection of offset launches normalized by fiber length. It basically assesses a modal dispersion. Low DMD value (i.e., low modal dispersion as measured by DMD) generally results in higher EMB.

Basically, a DMD graphical representation is obtained by injecting a light pulse having a given wavelength $\lambda_0$ at the center of the fiber and by measuring the pulse delay after a given fiber length L, the introduction of the light pulse of given wavelength $\lambda_0$ being radially offset to cover the entire core of the multimode fiber. Individual measurements are thus repeated at different radial offset values so as to provide a cartography of the modal dispersion of the examined multimode fiber. The results of these DMD measurements are then post-processed to determine an effective transfer function of the optical fiber, from which a value of EMB may be determined.

Nowadays, all multimode fiber manufacturers perform DMD measurements and EMB assessments at a single wavelength only (typically at 850 nm+/−1 nm for OM4 qualification and +/−10 nm for OM3 qualification) of their whole production.

With the advent of new multimode fiber applications requiring high EMB over a wide operating window, one of the main concerns of the multimode fiber manufacturers is to have the ability to easily assess the EMB over a wide wavelength range.

Using the aforesaid classical measurement procedure (comprising a series of DMD measurements and an EMB assessment) to determine the optical fiber's EMB over a range of wavelengths (i.e., at a plurality of wavelengths) would require performing as many measurement procedures as there are wavelengths in the wavelength range of interest.

Making distinct independent DMD and EMB measurements to determine the optical fiber's EMB at multiple wavelengths greatly leads to an increase of the measurement time and thus the cost of measuring and producing the wide-band multimode fiber. Such a solution would notably require implementation of several light sources, each emitting in a distinct wavelength and several corresponding detectors, which would represent a complex and costly operation.

Therefore, there remains a need for a simple and low-cost method for assessing the performance in terms of Effective Modal Bandwidth of a wide-band multimode optical fiber over multiple wavelengths.

4. GOALS OF THE INVENTION

The invention, in at least one embodiment, is aimed especially at overcoming these different drawbacks of the prior art.

More specifically, it is a goal of at least one embodiment of the invention to provide an improved method for qualifying the Effective Modal Bandwidth of a multimode optical fiber over a wide wavelength range.

It is another goal of at least one embodiment of the invention to provide a method of this kind that is simple to implement and that reduces costs of measuring and producing wide-band multimode fibers.

It is also a goal of at least one embodiment of the invention to provide a method that does not require in situ measurements for estimating the Effective Modal Bandwidth of multimode optical fibers over a wide wavelength range.

5. SUMMARY OF THE INVENTION

A particular embodiment of the invention proposes a method for qualifying effective modal bandwidth of a multimode optical fiber over a predetermined wavelength range, the method comprising a step of obtaining an actual DMD plot using a measurement of Dispersion Modal Delay (DMD) carried out on said multimode optical fiber at a single wavelength, said actual DMD plot comprising a plurality of traces recorded at different radial offset values $r_{offset}$ from an axis of said multimode optical fiber where $r_{offset}=0$ to a radial offset value $r_{offset}=a$, where a is the core radius of said multimode optical fiber. Such a qualifying method comprises steps of:

generating at least two distinct modified DMD plots from said actual DMD plot, each modified DMD plot being generated by applying to the recorded traces a temporal delay $\Delta t$ that increases in absolute values with said radial offset value $r_{offset}$, each modified DMD plot being associated with a predetermined bandwidth threshold;

and for each modified DMD plot:

computing an effective modal bandwidth of said multimode optical fiber as a function of said modified DMD plot;

comparing said computed effective modal bandwidth with the predetermined bandwidth threshold to which said modified DMD plot is associated.

Thus, as a function of the results of the comparing step, the method according to the invention enables qualifying the actual effective modal bandwidth ("actual EMB") of the multimode fiber over the predetermined wavelength range with respect to given actual specifications. If the computed effective modal bandwidth for each modified DMD plot is higher than the bandwidth threshold value to which said modified DMD plot is associated, the multimode fiber is considered as potentially exhibiting a satisfactory actual EMB over the predetermined wavelength range. In that case, the multimode fiber can be pre-selected to undergo an in situ EMB measurement. In the contrary case, the multimode fiber is considered as exhibiting no satisfactory actual EMB over the predetermined wavelength range and can be then rejected.

The invention therefore allows selecting (or pre-selecting) only the multimode fibers that are likely to exhibit an actual EMB that meets the required specifications at several wavelengths over a wide wavelength range (for example, at 850 nm, 875 nm, 900 nm, 925 nm, 950 nm), so as to limit in situ EMB measurements to be performed to a limited number of fibers and to avoid wasting time with fibers that have no chance to meet these requirements.

The principle of the invention relies on a wholly novel and inventive approach for guaranteeing the actual effective modal bandwidth of multimode fibers over a predetermined wavelength range from a single wavelength measurement. It consists of restricting the DMD measurement to a single wavelength only and transforming the DMD measurement so as to predict actual EMB for other wavelengths. To that end, the DMD measurement results obtained at a single wavelength (i.e., the DMD plot) is astutely modified by adding, to each trace of the DMD plot, a temporal delay $\Delta t$ that increases, in absolute value, with the radial offset. Each modified DMD plot is associated with a predetermined bandwidth threshold, which is defined according to a threshold calibration process. The computed EMB obtained from the modified DMD plot is then compared to the corresponding bandwidth threshold.

Thus, while the DMD measurement is restricted to a single wavelength, the value of EMB may be extrapolated to wavelengths other than this single wavelength. The present disclosure hence enables, contrary to the prior art techniques, estimating the actual effective modal bandwidth of the multimode fiber over a wide wavelength range, without requiring any additional equipment or DMD measurements before carrying in situ EMB measurements. Therefore, this helps to reduce costs of measuring and producing wide-band multimode fibers (as it is based only on a post-processing of DMD measurement).

According to a particular advantageous feature, each modified DMD plot is generated by applying the temporal delay Δt satisfying the following equation:

$$\Delta t(r_{offset}) = \Phi \cdot L \cdot \frac{r_{offset}}{a}$$

where:
- Φ is a non-zero integer representative of a wavelength shift relative radial delay, which is associated with the corresponding predetermined bandwidth threshold to which said modified DMD plot is associated;
- L is the length of said multimode optical fiber;
- a is the core radius of said multimode optical fiber;
- $r_{offset}$ is the radial offset value, from the axis of said multimode optical fiber where $r_{offset}$=0 to $r_{offset}$=a, at which is injected a light pulse at said single wavelength during the DMD measurement.

The temporal delay Δt depends on the radial offset and a wavelength shift relative radial delay that takes into account a wavelength offset. Each wavelength shift relative radial delay is associated with a predetermined bandwidth threshold defined according to a threshold calibration process. For each wavelength shift relative radial delay, the computed EMB obtained from the modified DMD plot is then compared to the corresponding EMB threshold. If the computed effective modal bandwidth for each wavelength shift relative radial delay Φ is higher than the bandwidth threshold value to which said wavelength shift relative radial delay Φ is associated, the multimode fiber is considered as potentially exhibiting a satisfactory actual EMB over the predetermined wavelength range. In that case, the multimode fiber can be pre-selected to undergo an in situ EMB measurement. In the contrary case, the multimode fiber is considered as exhibiting no satisfactory actual EMB over the predetermined wavelength range and can be then rejected.

According to a particular feature, first and second modified DMD plots are generated from said actual DMD plot respectively on the basis of:
- a first wavelength shift relative radial delay, equal to 180 ps/km, which is associated with a first bandwidth threshold, equal to 6,700 MHz-km,
- a second wavelength shift relative radial delay, equal to 220 ps/km, which is associated with a second bandwidth threshold, equal to 5,200 MHz-km.

Thanks to this calibration process, the multimode fibers meeting these requirements are likely to meet EMB specifications that are expected to be compliant with standards.

According to a particular feature, the qualifying method further comprises:
- a step of computing an initial effective modal bandwidth of said multimode optical fiber directly as a function of said actual DMD plot,
- a step of comparing said initial effective modal bandwidth with an initial predetermined bandwidth threshold equal to 4,700 MHz-km.

Only based on the raw DMD measurement results, it is thus possible to have an additional requirement that the multimode fiber must further meet to be considered as being likely to meet EMB specifications.

According to a particular feature, said step of computing an effective modal bandwidth is carried out by means of a transfer function.

According to a particular feature, the predetermined wavelength range is between 850 nm and 950 nm.

According to a particular feature, the actual effective modal bandwidth measured in situ on said multimode optical fiber is greater than 4,700 MHz-km for a wavelength of 850 nm, greater than 3,800 MHz-km for a wavelength of 875 nm, greater than 3,300 MHz-km for a wavelength of 900 nm, greater than 3,100 MHz-km for a wavelength of 925 nm, and greater than 2,900 MHz-km for a wavelength of 950 nm.

In another embodiment, the invention pertains to a method for selecting a high effective modal bandwidth multimode optical fiber from a batch of multimode optical fibers, characterized in that the method comprises steps of:
- selecting a batch of multimode optical fibers;
- qualifying the actual effective modal bandwidth of each multimode optical fiber with the above-mentioned qualifying method (in any of its different embodiments),
- selecting only those multimode optical fibers for which, for each modified DMD plot, said computed effective modal bandwidth is higher than the predetermined bandwidth threshold to which said modified DMD plot is associated.

In that particular embodiment, the invention thus provides a method for selecting a high effective modal bandwidth multimode optical fiber from a batch of multimode optical fibers, using a Dispersion Modal Delay measurement at a single wavelength. Thus, the invention allows selecting (or pre-selecting) only the multimode fibers that are likely to exhibit satisfactory bandwidths at several wavelengths over a wide wavelength range (for example, at 850 nm, 875 nm, 900 nm, 925 nm, 950 nm), so as to limit in situ EMB measurements to be performed to a limited number of fibers. Therefore, this helps to reduce costs of measuring and producing wide-band multimode fibers.

In another embodiment, the invention pertains to a computer program product comprising program code instructions for implementing the above-mentioned qualifying method (in any of its different embodiments) when said program is executed on a computer or a processor.

In another embodiment, the invention pertains to a non-transitory computer-readable carrier medium, storing a program which, when executed by a computer or a processor, causes the computer or the processor to carry out the above-mentioned qualifying method (in any of its different embodiments).

6. LIST OF FIGURES

Other features and advantages of embodiments of the invention shall appear from the following description, given by way of indicative and non-exhaustive examples and from the appended drawings, of which.

7. DETAILED DESCRIPTION

In all of the figures of the present document, identical elements and steps are designated by the same numerical reference sign.

The general principle of the invention relies on a method of assessing the Effective Modal Bandwidth (EMB) of multimode fibers over a predetermined wavelength range based on DMD measurement results obtained only at a single wavelength. The invention enables maximizing the probability that the effective modal bandwidth meets a predefined specification over a wide wavelength range from one DMD measurement at a single wavelength.

Figure 1:
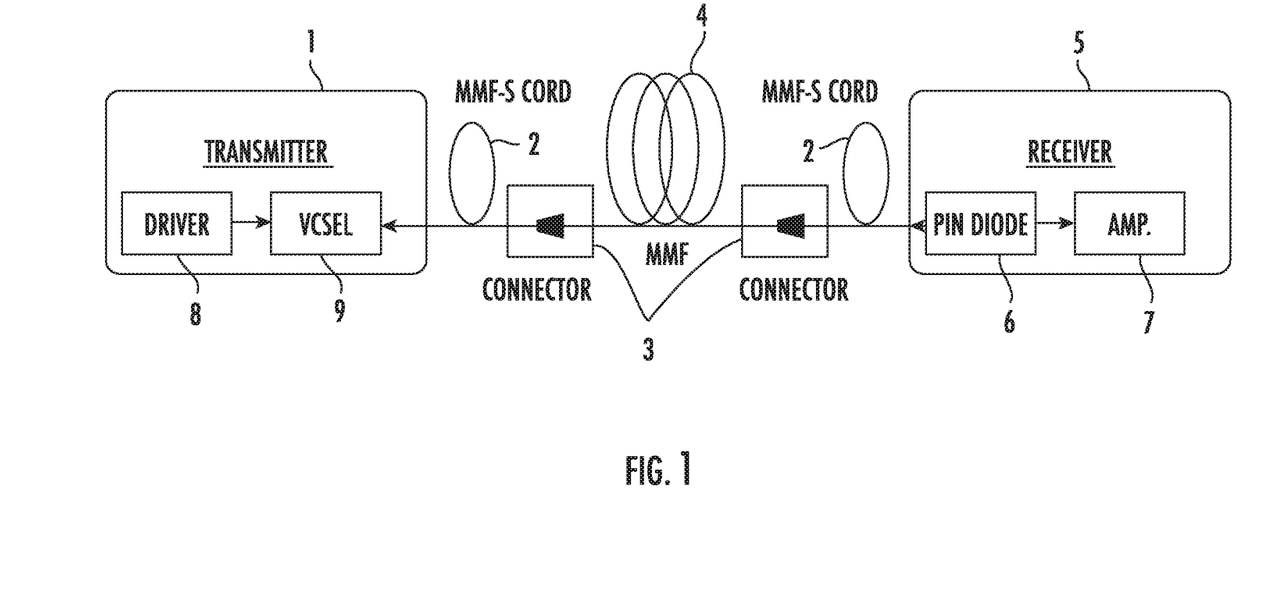
FIG. 1 shows an example of an optical communication system implementing a multimode optical fiber.

FIG. 1 shows an example of an optical communication system including a multimode fiber, which may be assessed according to the present disclosure. A multi-Gigabits Ethernet optical communication system successively comprises a driver 8 of a transmitter 1, a VCSEL source 9 of a transmitter 1, a launch cord 2, a connector 3, a multimode fiber 4, a connector 3, a launch cord 2, a PIN diode 6 of a receiver 5, and an amplifier 7 of a receiver 5. A digital signal at 10 Gbps or 25 Gbps is generated by the driver 8, which directly modulates the VCSEL source 9.

Figure 3:
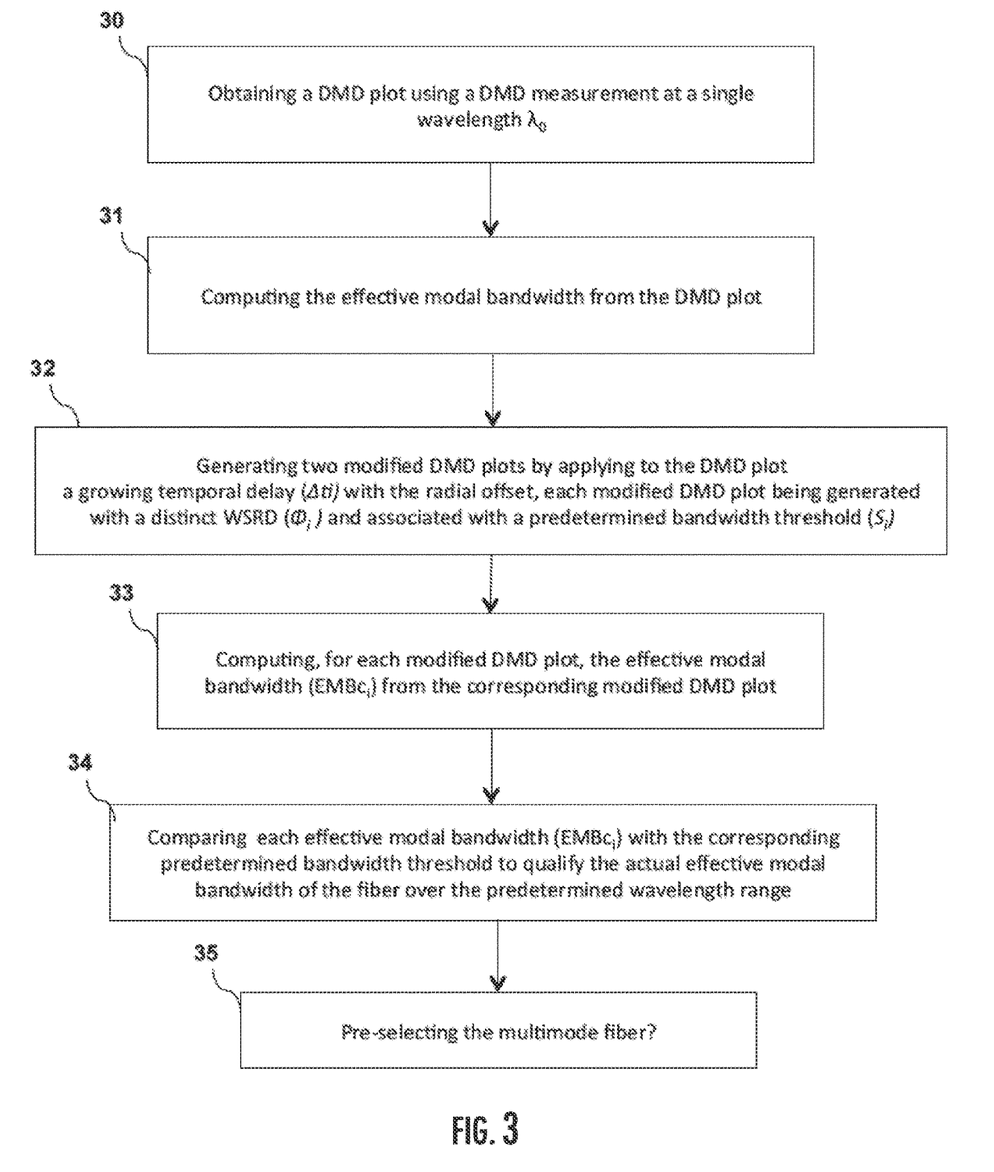
FIG. 3 provides a flowchart of a particular embodiment of the method for assessing the EMB of a multimode fiber according to the invention.

FIG. 3 illustrates by a synoptic diagram the method of assessing the EMB of a multimode fiber according to a particular embodiment of the invention.

In step 30, a characterization of the multimode fiber is carried out using a differential-mode-delay measurement technique, hereafter called DMD measurement (e.g., as set forth in the FOTP-220 standard).

Figure 2:
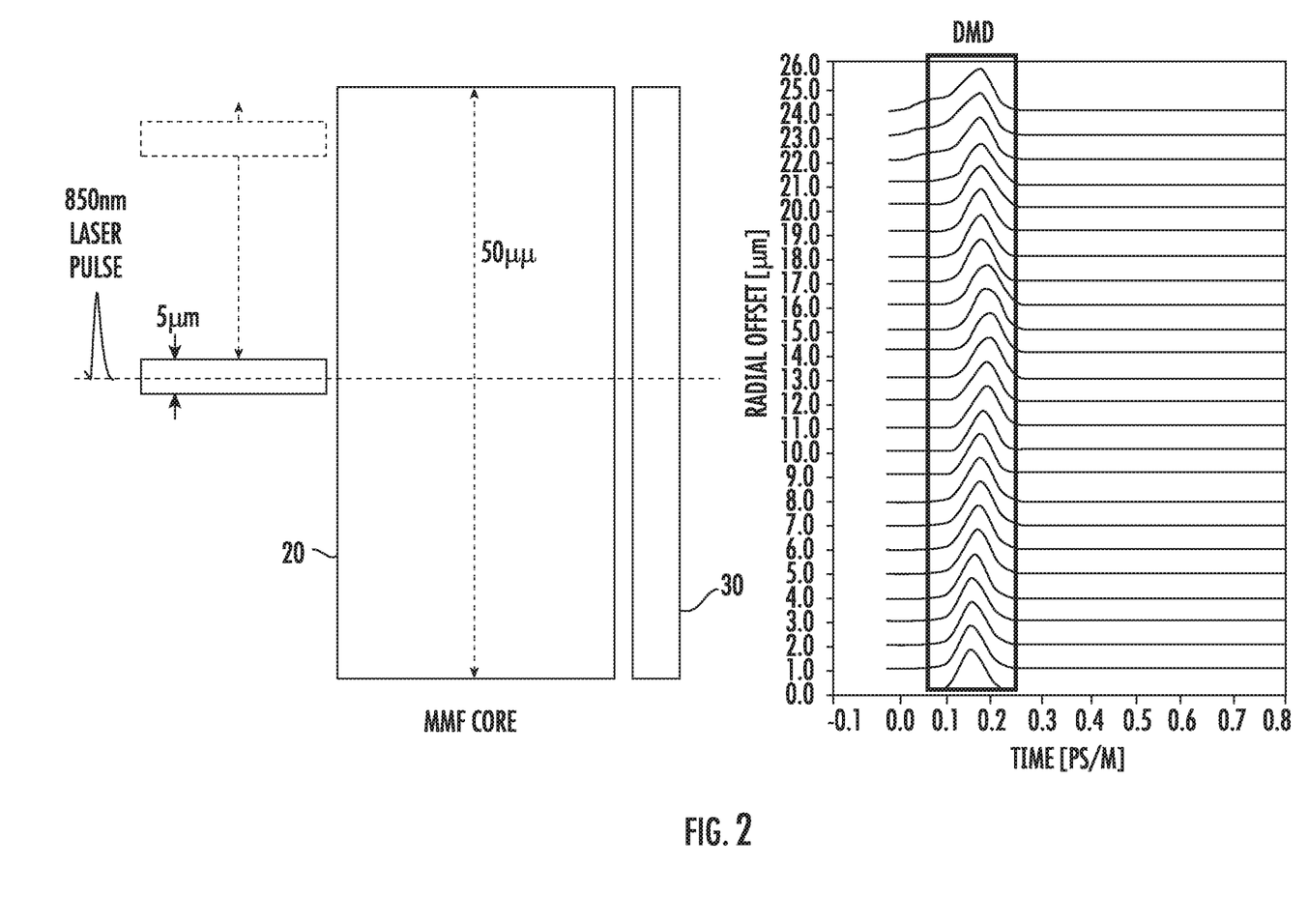
FIG. 2 provides a schematic illustration of a classical DMD measurement technique.

FIG. 2 illustrates the principle of the DMD measurement technique. This technique consists of successively injecting into the multimode fiber a light pulse (ultrafast laser pulse) having a given single mode wavelength ($\lambda_0$=850 nm, for example), with a radial offset between each successive pulse. Delay of each pulse is then measured after a given length (L) of fiber. Multiple identical light pulses are injected at different radial offset values ($r_{offset}$) ("offset launch"), from an axis of the fiber where $r_{offset}$=0 (optical core's center) to $r_{offset}$=a, with a the core radius of the fiber.

More precisely, an optical reference pulse at 850 nm is emitted by a source and launched into the core 10 of a single-mode launch fiber with a core diameter of 5 μm. From the end of the single-mode fiber, it is stepped across the core of a multimode fiber (MMF) 20 under test. The multimode fiber 20 has typically a core diameter of 50 μm. For each offset across the core (0 to 25 microns by increment of 1 micron, for example), the propagation delay of the resultant output pulse is recorded by a high bandwidth optical receiver 30, giving the shape of the transmitted pulse, hereafter called a DMD measurement. The y-axis depicts the radial offset (or "radial launch") in micrometers with respect to the optical core's center and the x-axis depicts the time in picoseconds.

DMD values can be obtained from the DMD measurement or DMD plot by measuring the difference in delay using the leading edge of the fastest pulse and the trailing edge of the slowest pulse. From this difference, the temporal width is subtracted from the launch pulse, which yields the modal dispersion of the multimode fiber 30.

Figure 4A:
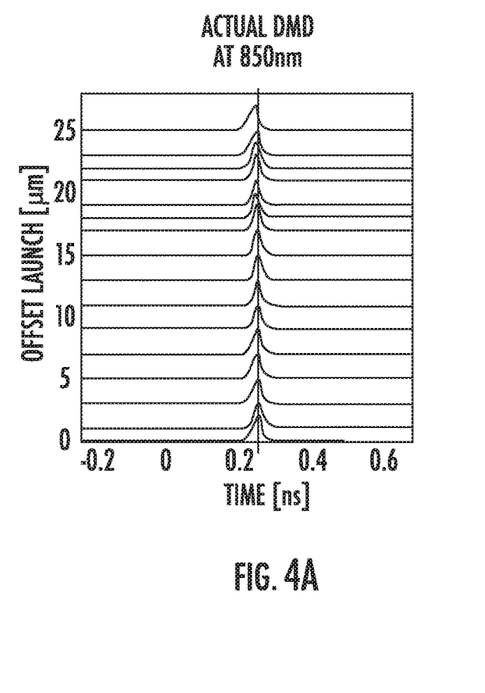
FIGS. 4A-4E illustrate an example of transformation of a DMD graph into a modified DMD graph for a multimode optical fiber according to a particular embodiment of the invention.

The graph of FIG. 4A illustrates an example of DMD graph performed on the 50-μm multimode optical fiber at $\lambda_0$=850 nm. In this example, the DMD measurement (or DMD plot) comprises a set of sixteen recorded traces, also hereafter called "DMD traces." Each recorded trace corresponds to a measurement carried out to a radial offset value ($r_{offset}$) with respect to the optical core's center.

In step 31, a value of Effective Modal Bandwidth, $EMB_0$, of the optical fiber is determined from this DMD plot. More particularly, this value $EMB_0$, called initial Effective Modal Bandwidth, is derived from a transfer function, which depends on the set of DMD traces obtained in step 30 (plot illustrated in FIG. 4A) by generating a fiber response as a linear combination of the DMD traces. It should be noted that this particular step is optional to the implementation of the assessing method according to the invention. It can lead the assessing method to have better EMB predictive capabilities. Usually, one generates several transfer functions to compute a series of EMB values, typically ten values, and assesses the minimum EMB obtain as the EMB of the fiber.

The step 32 consists of modifying the actual DMD plot obtained in step 30 by applying a temporal delay $\Delta t$ to the recorded traces of the DMD plot, (FIG. 4A) so as to generate a modified DMD plot (i.e., a DMD measurement delayed in time as a function of the radial offset value with a given delay), the temporal delay $\Delta t$ satisfying the following equation:

$$\Delta t_i(r_{offset}) = \Phi_i \cdot L \cdot \frac{r_{offset}}{a} \quad (1)$$

where:
  $\Phi_i$ is a non-zero (positive or negative) integer representative of a wavelength shift relative radial delay (hereafter called "WSRD"), the index i being a positive integer;
  L is the length of the multimode fiber used during the DMD measurements (e.g., 550 m);
  a is the core radius of said multimode optical fiber (e.g., 25 μm);
  $r_{offset}$ is the radial offset, from an axis of said multimode optical fiber where $r_{offset}$=0 to $r_{offset}$=a, at which is injected a light pulse at said single wavelength ($\lambda_0$=850 nm) during the DMD measurement.

According to this equation, the modified DMD plot is thus generated by applying a temporal delay $\Delta t$ to the recorded traces of the original DMD plot, which increases in absolute values with the radial offset value $r_{offset}$. The step 32 is carried out for i values of wavelength shift relative radial delay to generate i modified DMD plots.

In the exemplary embodiment here illustrated, the temporal delay $\Delta t$ is applied to the actual DMD plot for two distinct wavelength shift relative radial delays, $\Phi_1$ and $\Phi_2$, to generate two modified DMD plots. Each wavelength shift relative radial delay $\Phi_i$ is associated with a predetermined bandwidth threshold value $S_i$ according to a threshold calibration process described below in relation to FIGS. 6a and 6b.

Figure 6A:
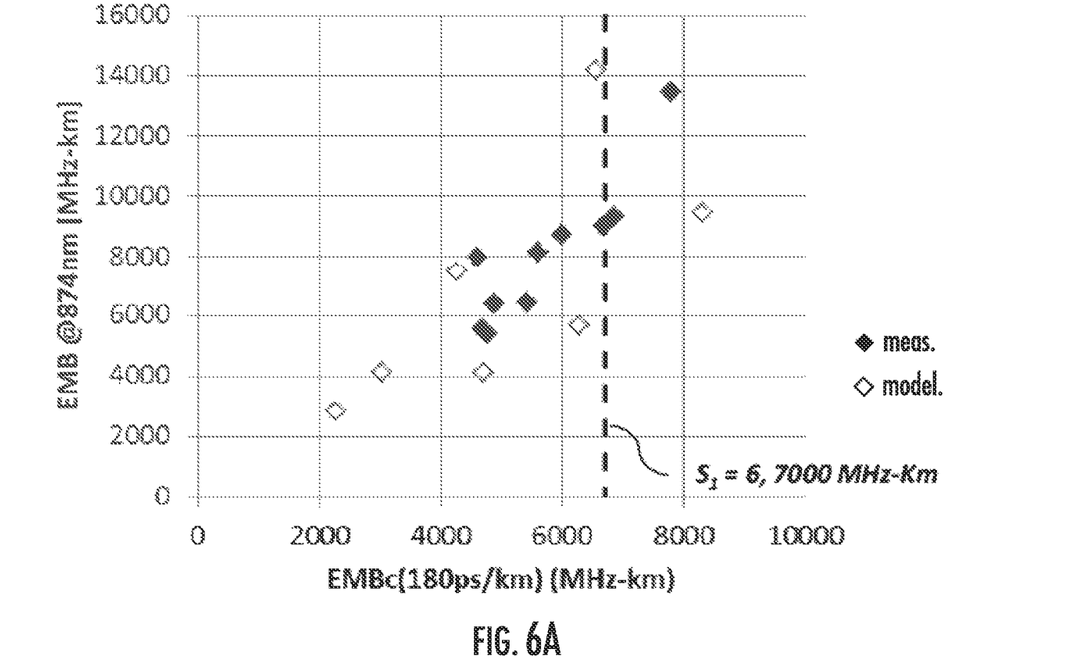
FIGS. 6a and 6b graphically depict the actual Effective Modal Bandwidth of a multimode fiber measured and modeled respectively at wavelengths of 874 nm and of 947 nm as a function of the computed Effective Modal Bandwidth.
Figure 6B:
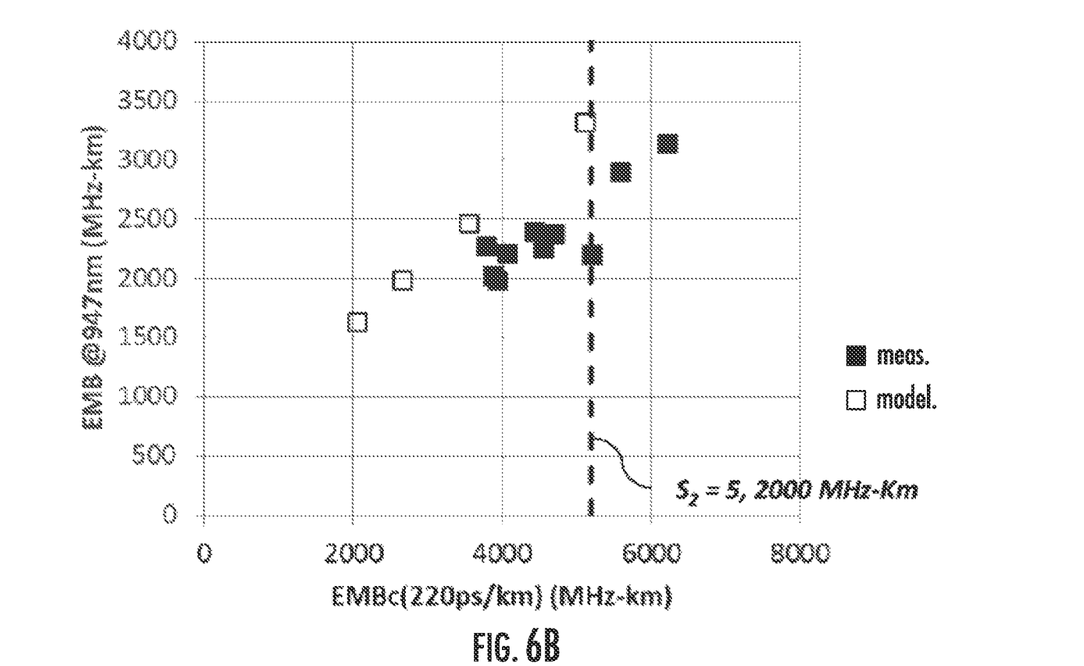

In this exemplary embodiment, the first WSRD $\Phi_1$ is equal to 180 ps/km and is associated with a first bandwidth thresholds $S_1$ equal to 6,700 MHz-km (FIG. 6a). The second WSRD $\Phi_2$ is equal to 220 ps/km and is associated with a second bandwidth thresholds $S_2$ equal to 5,200 MHz-km (FIG. 6b).

Figure 4B:
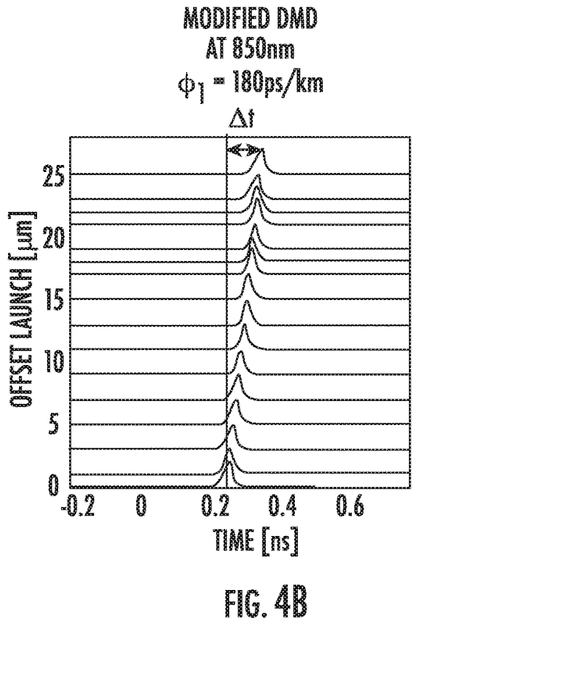
Figure 4C:
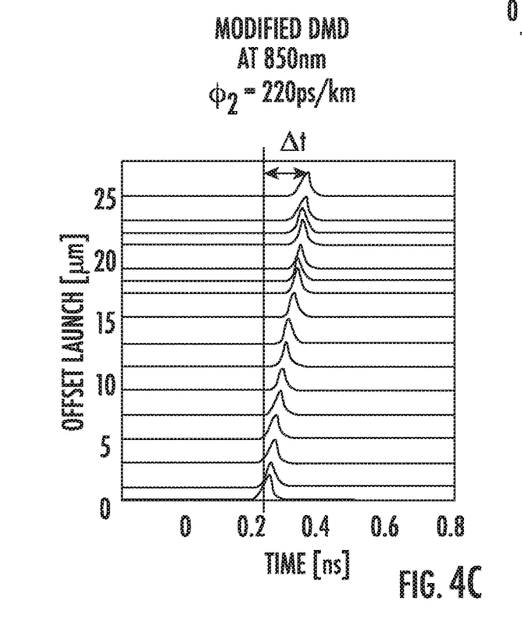

Thus, after applying, for each WSRD, the temporal delay $\Delta t$ to the DMD plot resulting from the single wavelength DMD characterization, the algorithm generates, at the end of the step 32, a first modified DMD plot for the WSRD $\Phi_1$, as illustrated on the graph of FIG. 4B, and a second modified DMD plot for the WSRD $\Phi_2$, as illustrated on the graph of FIG. 4C.

Regarding the graph of FIG. 4B, the first modified DMD plot has been obtained from the graph of FIG. 4A using the above equation (1) with the coefficient $\Phi_1$ (i=1). The first modified plot is associated with the first bandwidth thresholds $S_1$.

Regarding the graph of FIG. 4C, the second modified DMD plot has been obtained from the graph of FIG. 4B using the above equation (1) with the coefficient $\Phi_2$ (i=2). The second modified plot is associated with the second bandwidth thresholds $S_2$.

Of course, the principle of defining discussed above can be extended to a greater number of wavelength shift relative radial delays. The number of wavelength shift relative radial delays taken into account in the present example is limited purely for the purposes of pedagogical description. Of course, in order to ensure a better assessment of the actual EMB of the multimode fiber, a greater number of wavelength shift relative radial delays and associated bandwidth thresholds can be provided.

The invention is not limited to this exemplary embodiment, and the person skilled may also envisage other implementations of the step 32. He may envisage, for example, obtaining, first, a set of wavelength shift relative radial delays (each being associated with a bandwidth threshold value according to the above principle), then applying this set of WSRD values to the above formula (1). Another possible implementation could consist of obtaining one value of wavelength shift relative radial delay, then applying this value to the above formula (1) and repeating these two phases iteratively for each remaining value of wavelength shift relative radial delay. For example, the wavelength shift relative radial delays provided as the algorithm progresses are raising or lowering values.

In step 33, the algorithm calculates, for the first generated modified DMD plot (illustrated in FIG. 4B), a first Effective Modal Bandwidth of the multimode fiber, $EMBc_1$. The algorithm also calculates, for the second generated modified DMD plot (illustrated in FIG. 4C), a second Effective Modal Bandwidth of the multimode fiber, $EMBc_2$.

In step 34, the algorithm then compares the first calculated Effective Modal Bandwidth $EMBc_1$ with the first bandwidth threshold value $S_1$ to which the first wavelength shift relative radial delay $\Phi_1$ is associated, and the second calculated Effective Modal Bandwidth $EMBc_2$ with the second bandwidth threshold value $S_2$ to which the second wavelength shift relative radial delay $\Phi_2$ is associated, in order to qualify the actual EMB of the fiber over the wavelength range comprised between 850 nm and 950 nm. This step is illustrated in Table 1 below.

TABLE 1

| | |
|---|---|
| $\lambda_0$ = 850 nm | $EMB_0$ >4,700 MHz-km |
| $\lambda_0$ = 850 nm | $EMBc_1$ ($\Phi_1$ = 180 ps/km) >6,700 MHz-km |
| $\lambda_0$ = 850 nm | $EMBc_2$ ($\Phi_2$ = 220 ps/km) >5,200 MHz-km |
| $\lambda_0$ = 850 nm | ... |

Optionally, the method also compares the Effective Modal Bandwidth $EMBc_0$ calculated directly from the raw DMD measurement (obtained in step 31) with the bandwidth threshold of 4,700 MHz-km.

As a function of the results of the step 34, the algorithm delivers an estimate of potential performance in terms of EMB of the multimode fiber over the wavelength range 850 nm-950 nm. As a function of that estimate, in step 35, the fiber being processed is either pre-selected to undergo an in situ EMB measurement or rejected.

If the above set of criteria illustrated in Table 1 is met, this means that the multimode fiber is likely to meet the following actual EMB requirements:

TABLE 2

| Wavelength | EMB requirements |
|---|---|
| 850 nm | EMB >4,700 MHz-km |
| 875 nm | EMB >3,800 MHz-km |
| 900 nm | EMB >3,300 MHz-km |
| 925 nm | EMB >3,100 MHz-km |
| 950 nm | EMB >2,900 MHz-km |

The inventors discovered that if a multimode fiber has a first calculated Effective Bandwidth, $EMBc_1$, higher than 6,700 MHz-km and a second calculated Effective Bandwidth, $EMBc_2$, higher than 5,200 MHz-km, for first and second wavelength shift relative radial delays equal to 180 ps/km and 220 ps/km respectively, such a fiber is then likely to meet these EMB requirements that are expected to be compliant with 4×25 Gbps (WDM) error free transmission over 150 m.

As an example, the inventors take a batch of multimode optical fibers, whose actual EMB is assessed according to the qualifying method of the present disclosure. The principle here consists of pre-selecting the fiber or fibers meeting the above criteria.

In that context, each multimode fiber that meets the aforesaid criteria then can be pre-selected, because it is expected to ensure meeting the actual EMB requirement over the wavelength range 850 nm-950 nm. Thus, by pre-selecting only the potentially interesting multimode fibers for in situ EMB measurements, the number of additional actual EMB measurements at other wavelengths over 850 nm to 950 nm is reduced, thereby reducing costs of measuring.

Thus, the invention relies on an adequate adjustment of the EMB thresholds and wavelength shift relative radial delay (Table 1) to guarantee the fiber meets the above actual EMB requirements (Table 2).

It should be noted that the values of EMB threshold and wavelength shift relative radial delay may depend on the chemistry of the refractive index profile of the fiber and the nominal refractive index profile. In the exemplary embodiment described here above, the inventors are focused on 50-micrometer multimode fibers of the type OM4 doped with Germanium and/or Fluorine and/or Phosphorus.

Figure 4D:
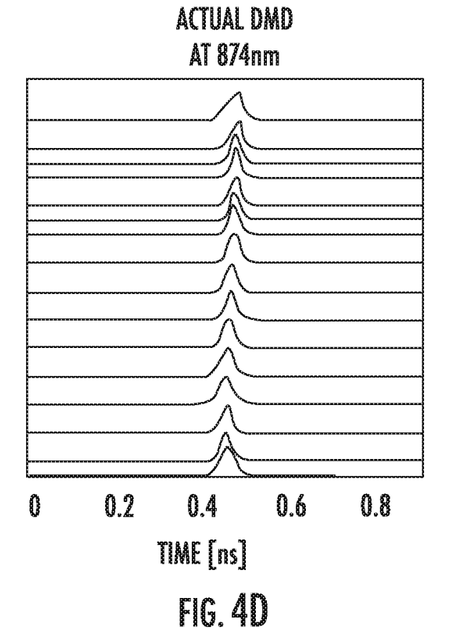
Figure 4E:
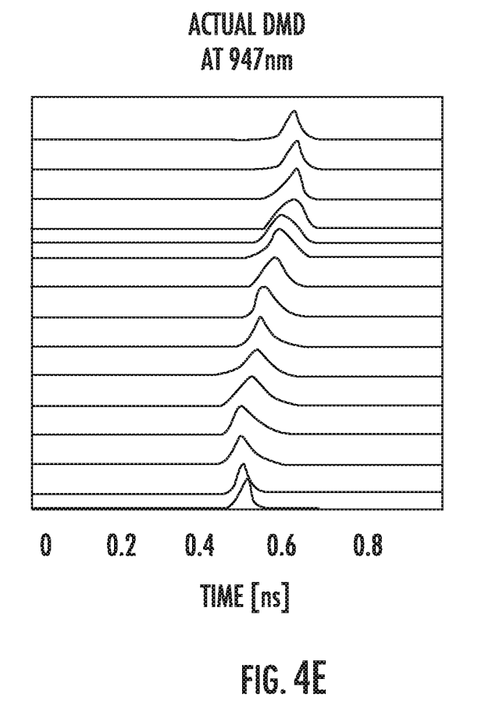
Figure 7:
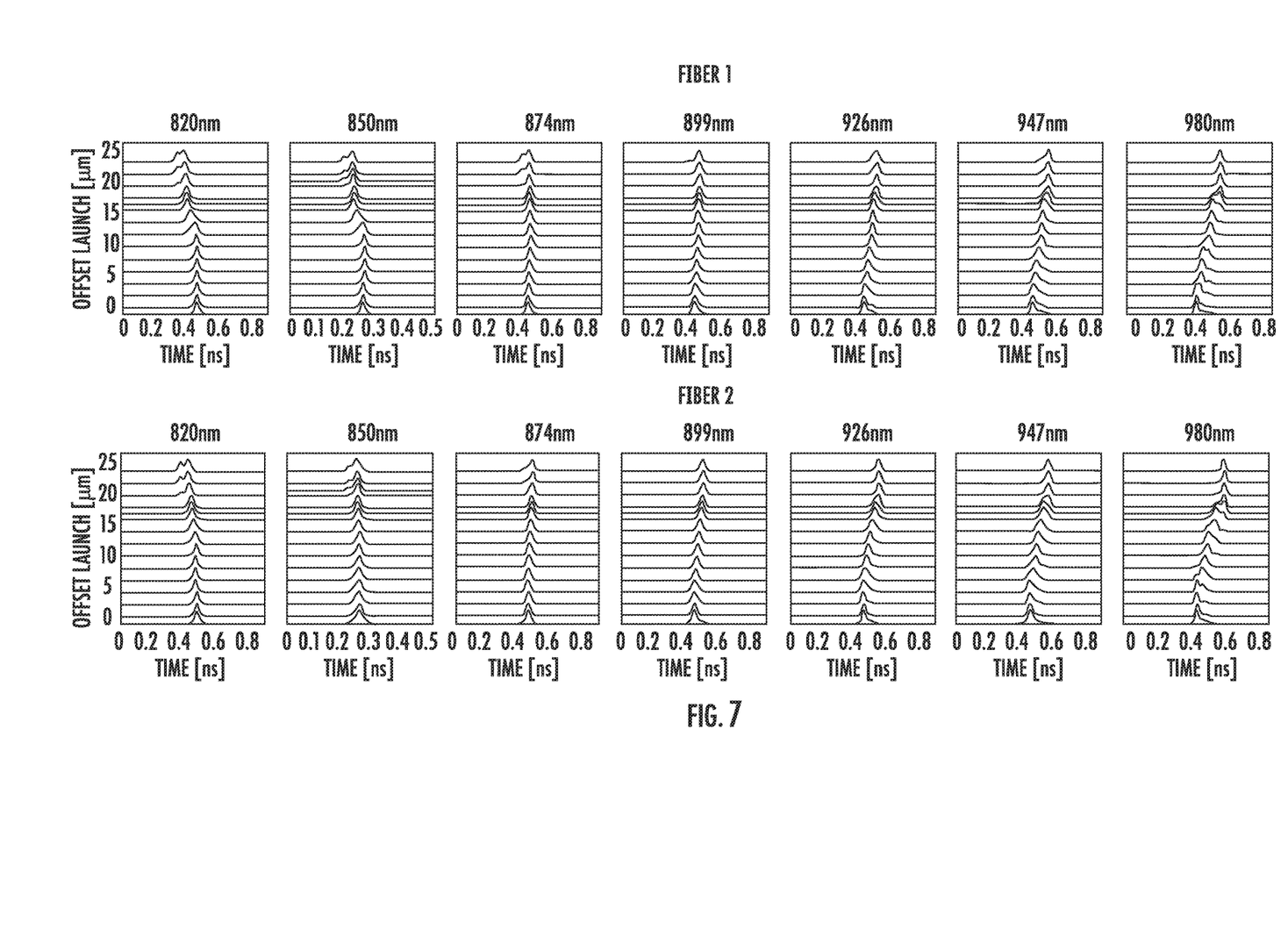
FIG. 7 illustrates an example of actual DMD measurements performed for different wavelengths for two multimode optical fibers.

FIG. 4D and FIG. 4E depict the actual DMD measurements performed at 874 nm and at 947 nm, respectively. They enable comparing the modified DMD measurement at the single wavelength 850 nm obtained for $\Phi_1$ equal to 180 ps/km and $\Phi_2$ equal to 220 ps/km, and the actual DMD measurements. It shows that $\Phi_1$ (FIG. 4B) is correlated to the actual DMD measurements performed at 874 nm (FIG. 4D) and $\Phi_2$ (FIG. 4C) is correlated to the actual DMD measurements performed at 874 nm (FIG. 4E). It should be noted that the wavelength shift relative radial delays applied here are positive integers. This enables predicting the actual EMB for wavelengths higher than 850 nm (for example, 874 nm, 899 nm, 926 nm, 947 nm, and 980 nm as illustrated in FIG. 7). Of course, negative integers can be applied so as to predict actual EMB for wavelengths lower than 850 nm (for example, 820 nm, as illustrated in FIG. 7).

Figure 5:
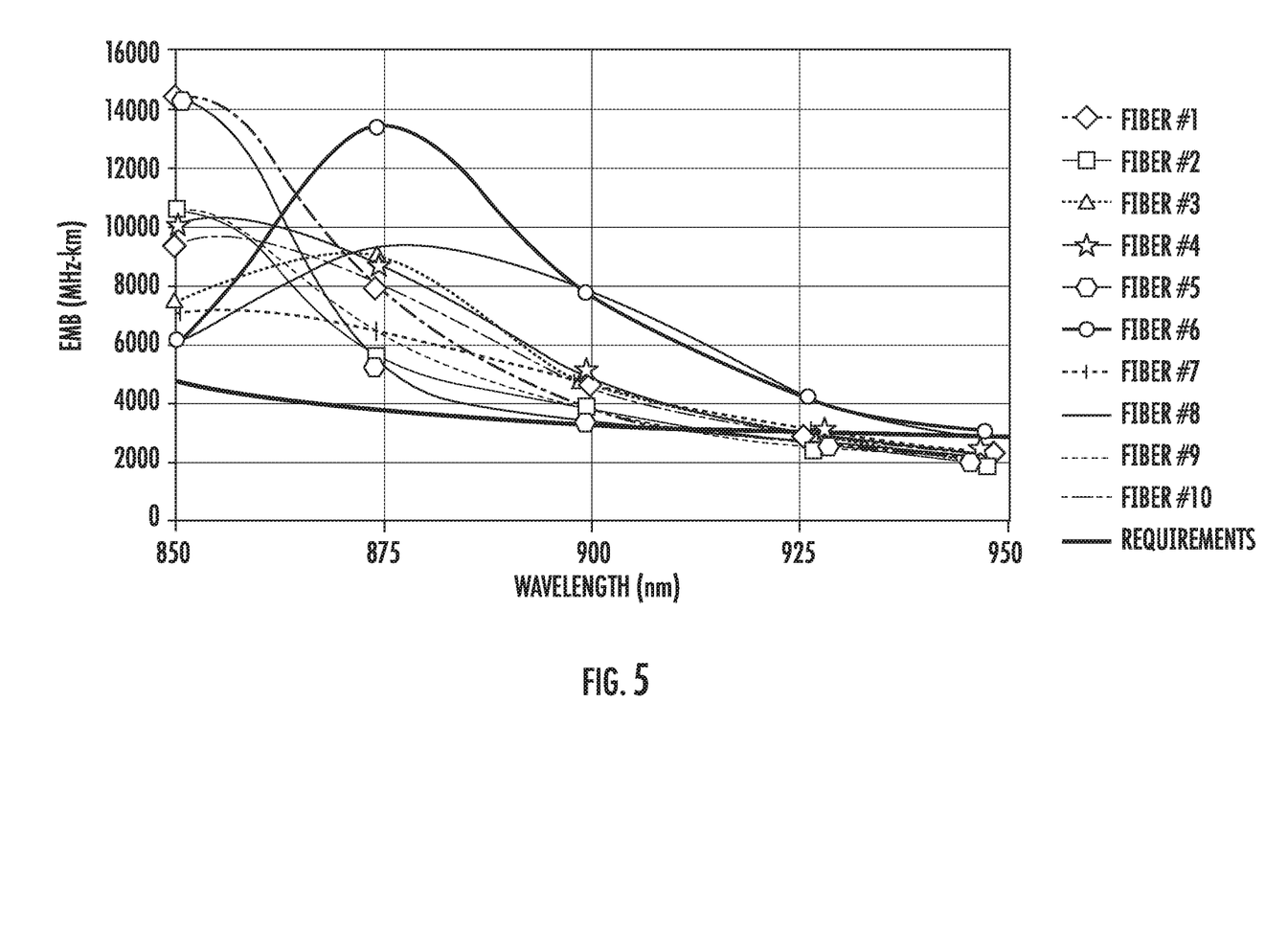
FIG. 5 graphically depicts the actual Effective Modal Bandwidth of several multimode fibers as a function of the wavelength.

FIG. 5 graphically depicts the EMB measured for ten multimode fibers over a wide wavelength range comprised between 850 nm and 950 nm. The "requirement" curve illustrates the evolution of the aforesaid $EMBc_i$ criteria (see Table 2).

This graph highlights that the fibers for which the curve is higher than the "requirement" curve are likely to meet the expected EMB requirements for this kind of fiber.

FIGS. 6a and 6b graphically depict the actual EMB of a multimode fiber measured and modeled at a wavelength of 874 nm and of 947 nm, respectively, as a function of the computed effective modal bandwidth ($EMBc_i$). The dashed vertical lines at 6,700 MHz-km and 5,200 MHz-km represent, respectively, the first and second bandwidth thresholds $S_1$ and $S_2$ established in the exemplary embodiment of FIG. 3.

It shows that the calculated Effective Modal Bandwidths $EMBc_1$ ($\Phi_1$=180 ps/km) and $EMBc_2$ ($\Phi_2$=220 ps/km) are correlated to the measured Effective Modal Bandwidths at the wavelengths of 874 nm and 947 nm, respectively.

The bandwidth thresholds according to the invention are thus established by comparing the actual values of effective modal bandwidth with the computed values of effective modal bandwidth at the other wavelengths.

FIG. 7 illustrates an example of actual DMD measurements performed at a wavelength of 820, 874, 899, 926, 947, and 980 nm for two multimode optical fibers: Fiber 1 and Fiber 2.

Figure 8:
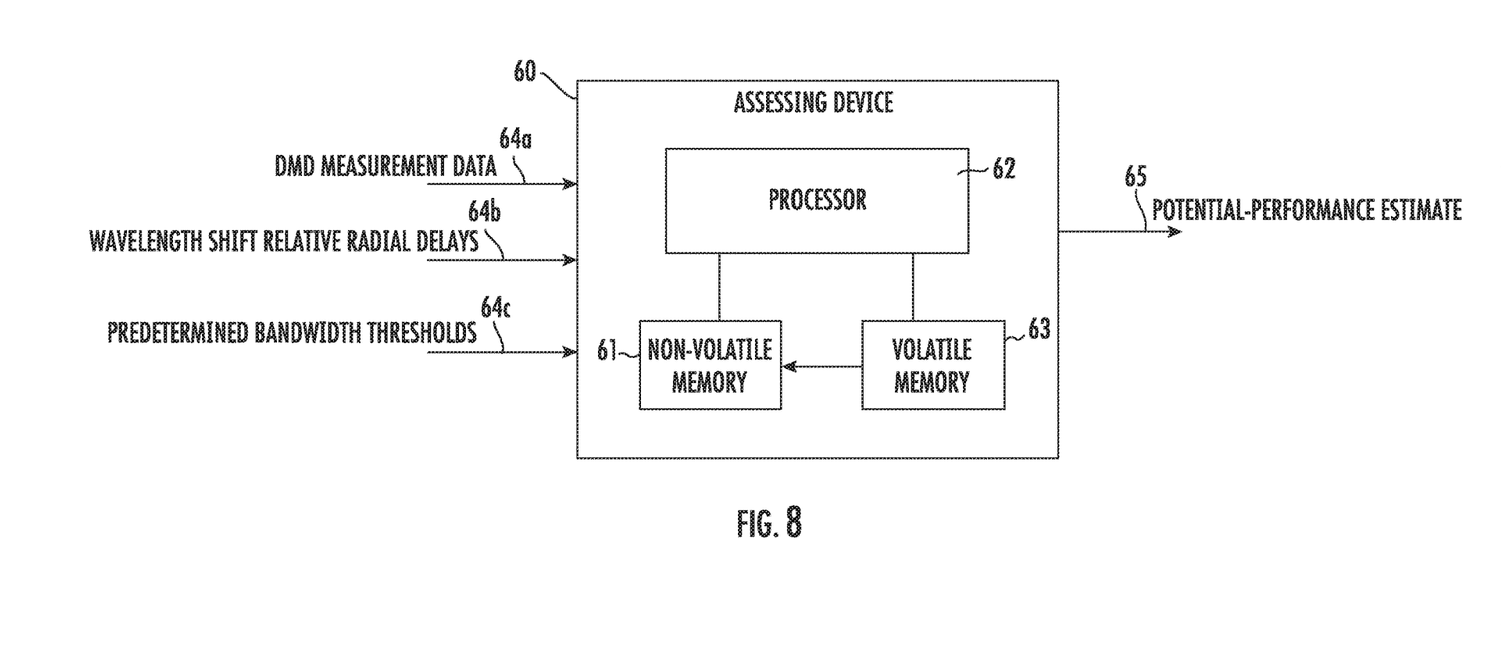
FIG. 8 shows the simplified structure of an assessing device according to a particular embodiment of the invention.

FIG. 8 shows the simplified structure of an assessing device 60 according to a particular embodiment of the invention, which carries out the method shown in FIG. 3 for example.

The device 60 comprises a non-volatile memory 61 (e.g., a read-only memory (ROM) or a hard disk), a volatile memory 63 (e.g., a random access memory or RAM), and a processor 62. The non-volatile memory 61 is a non-transitory computer-readable carrier medium. It stores executable program code instructions, which are executed by the processor 62 in order to enable implementation of the qualifying method described above in relation to FIG. 3.

Upon initialization, the aforementioned program code instructions are transferred from the non-volatile memory 61 to the volatile memory 63 so as to be executed by the processor 62. The volatile memory 63 likewise includes registers for storing the variables and parameters required for this execution.

The device 60 receives as inputs the DMD measurement data 64a, a plurality of wavelength shift relative radial delays 64b, and a plurality of corresponding predetermined bandwidth thresholds 64c. The device 60 generates as outputs an estimate 65 of potential performance in terms of EMB of the multimode fiber over a predetermined wavelength range.

All the steps of the above steering method can be implemented equally well:
by the execution of a set of program code instructions executed by a reprogrammable computing machine, such as a PC type apparatus, a DSP (digital signal processor), or a microcontroller. These program code instructions can be stored in a non-transitory computer-readable carrier medium that is detachable (for example, a floppy disk, a CD-ROM, or a DVD-ROM) or non-detachable; or
by a dedicated machine or component, such as an FPGA (Field Programmable Gate Array), an ASIC (Application-Specific Integrated Circuit), or any dedicated hardware component.

In other words, the invention is not limited to a purely software-based implementation, in the form of computer program instructions, but it can also be implemented in hardware form or any form combining a hardware portion and a software portion.

Although the present disclosure has been described with reference to one or more examples, workers skilled in the art will recognize that changes may be made in form and detail without departing from the scope of the disclosure and/or the appended claims.

The invention claimed is:

1. A method for qualifying effective modal bandwidth (EMB) of a multimode optical fiber over a predetermined wavelength range, the method comprising:
injecting a pulsed light of a single wavelength ($\lambda_o$) into a multimode optical fiber with a radial offset between each successive pulse;
measuring, from the injected pulsed light, Dispersion Modal Delay (DMD) of said multimode optical fiber to obtain an actual DMD plot, said actual DMD plot comprising a plurality of traces recorded at different radial offset values $r_{offset}$, from an axis of said multimode optical fiber where $r_{offset}$=0 to a radial offset value $r_{offset}$=a where a is a core radius of said multimode optical fiber;
generating, with a processor, at least two distinct modified DMD plots from said actual DMD plot, each modified DMD plot being generated by applying to the recorded traces a temporal delay $\Delta t$ that increases in absolute values with said radial offset value $r_{offset}$, each modified DMD plot being associated with a predetermined bandwidth threshold ($S_1$; $S_2$); and
for each of said modified DMD plots:
estimating, with a processor, an effective modal bandwidth ($EMBc_1$; $EMBc_2$) of said multimode optical fiber as a function of said modified DMD plot; and
comparing, with a processor, said estimated effective modal bandwidth ($EMBc_1$; $EMBc_2$) with the corresponding predetermined bandwidth threshold ($S_1$; $S_2$) to which said modified DMD plot is associated.

2. The method according to claim 1, wherein each modified DMD plot is generated by applying the temporal delay $\Delta t$ satisfying the following equation:

$$\Delta t(r_{offset}) = \Phi \cdot L \cdot \frac{r_{offset}}{a}$$

where:
$\Phi$ is a non-zero integer representative of a wavelength shift relative radial delay, which is associated with the corresponding predetermined bandwidth threshold to which said modified DMD plot is associated;
L is the length of said multimode optical fiber;
a is the core radius of said multimode optical fiber; and
$r_{offset}$ is the radial offset value, from the axis of said multimode optical fiber where $r_{offset}=0$ to $r_{offset}=a$, at which is injected a light pulse at said single wavelength during the DMD measurement.

3. The method according to claim 1, wherein first and second modified DMD plots are generated from said actual DMD plot respectively on the basis of:
a first wavelength shift relative radial delay ($\Phi_1$), equal to 180 ps/km, which is associated with a first bandwidth threshold ($S_1$), equal to 6,700 MHz-km; and
a second wavelength shift relative radial delay ($\Phi_2$), equal to 220 ps/km, which is associated with a second bandwidth threshold ($S_2$), equal to 5,200 MHz-km.

4. The method according to claim 1, further comprising:
computing an initial effective modal bandwidth ($EMB_0$) of said multimode optical fiber directly as a function of said actual DMD plot; and
comparing said initial effective modal bandwidth ($EMB_0$) with an initial predetermined bandwidth threshold equal to 4,700 MHz-km.

5. The method according to claim 1, wherein said step of estimating an effective modal bandwidth is carried out by means of a transfer function.

6. The method according to claim 1, wherein the predetermined wavelength range is between 850 nm and 950 nm.

7. The method according to claim 1, wherein the actual effective modal bandwidth measured in situ on said multimode optical fiber is greater than 4,700 MHz-km for a wavelength of 850 nm, greater than 3,800 MHz-km for a wavelength of 875 nm, greater than 3,300 MHz-km for a wavelength of 900 nm, greater than 3,100 MHz-km for a wavelength of 925 nm, and greater than 2,900 MHz-km for a wavelength of 950 nm.

8. A method for selecting a high effective modal bandwidth multimode optical fiber from a batch of multimode optical fibers, the method comprising:
selecting a batch of multimode optical fibers;
for each multimode optical fiber of the batch:
injecting a pulsed light of a single wavelength ($\lambda_0$) into the multimode optical fiber with a radial offset between each successive pulse;
measuring, from the injected pulsed light, Dispersion Modal Delay (DMD) of said multimode optical fiber to obtain an actual DMD plot, the actual DMD plot comprising a plurality of traces recorded at different radial offset values $r_{offset}$, from an axis of said multimode optical fiber where $r_{offset}=0$ to a radial offset value $r_{offset}=a$ where a is a core radius of said multimode optical fiber;
generating, with a processor, at least two distinct modified DMD plots from said actual DMD plot, each modified DMD plot being generated by applying to the recorded traces a temporal delay $\Delta t$ that increases in absolute values with said radial offset value $r_{offset}$, each modified DMD plot being associated with a predetermined bandwidth threshold ($S_1$; $S_2$); and
for each of said modified DMD plots:
estimating, with a processor, an effective modal bandwidth ($EMBc_1$; $EMBc_2$) of said multimode optical fiber as a function of said modified DMD plot; and
comparing, with a processor, the estimated effective modal bandwidth ($EMBc_1$; $EMBc_2$) with the corresponding predetermined bandwidth threshold ($S_1$; $S_2$) to which said modified DMD plot is associated; and
selecting only those multimode optical fibers of the batch for which, for each modified DMD plot, said estimated effective modal bandwidth is greater than the predetermined bandwidth threshold to which said modified DMD plot is associated.

9. A computer program product characterized in that it comprises program code instructions for implementing the method according to claim 1, when said program is executed on a computer or a processor.

10. A non-transitory computer-readable carrier medium storing a computer program product according to claim 9.

11. The method according to claim 8, wherein each modified DMD plot is generated by applying the temporal delay $\Delta t$ satisfying the following equation:

$$\Delta t(r_{offset}) = \Phi \cdot L \cdot \frac{r_{offset}}{a}$$

where:
$\Phi$ is a non-zero integer representative of a wavelength shift relative radial delay, which is associated with the corresponding predetermined bandwidth threshold to which said modified DMD plot is associated;
L is the length of said multimode optical fiber;
a is the core radius of said multimode optical fiber; and
$r_{offset}$ is the radial offset value, from the axis of said multimode optical fiber where $r_{offset}=0$ to $r_{offset}=a$, at which is injected a light pulse at said single wavelength during the DMD measurement.

12. The method according to claim 8, wherein first and second modified DMD plots are generated from said actual DMD plot respectively on the basis of:
a first wavelength shift relative radial delay ($\Phi_1$), equal to 180 ps/km, which is associated with a first bandwidth threshold ($S_1$), equal to 6,700 MHz-km; and
a second wavelength shift relative radial delay ($\Phi_2$), equal to 220 ps/km, which is associated with a second bandwidth threshold ($S_2$), equal to 5,200 MHz-km.

13. The method according to claim 8, further comprising:
computing an initial effective modal bandwidth ($EMB_0$) of said multimode optical fiber directly as a function of said actual DMD plot; and
comparing said initial effective modal bandwidth ($EMB_0$) with an initial predetermined bandwidth threshold equal to 4,700 MHz-km.

14. The method according to claim 8, wherein said step of estimating an effective modal bandwidth is carried out by means of a transfer function.

15. The method according to claim 8, wherein the predetermined wavelength range is between 850 nm and 950 nm.

16. The method according to claim 8, wherein the actual effective modal bandwidth measured in situ on said multimode optical fiber is greater than 4,700 MHz-km for a wavelength of 850 nm, greater than 3,800 MHz-km for a wavelength of 875 nm, greater than 3,300 MHz-km for a wavelength of 900 nm, greater than 3,100 MHz-km for a wavelength of 925 nm, and greater than 2,900 MHz-km for a wavelength of 950 nm.

* * * * *